United States Patent

[11] 3,586,117

[72] Inventor Ted L. Le Tourneau
 Longview, Tex.
[21] Appl. No. 31,858
[22] Filed May 1, 1970
[45] Patented June 22, 1971
[73] Assignee R. G. Le Tourneau, Inc.
 Longview, Tex.
 Continuation of application Ser. No.
 768,998, Oct. 21, 1968, now abandoned.

[54] METHOD AND SYSTEM FOR STEERING A VEHICLE
 33 Claims, 11 Drawing Figs.
[52] U.S. Cl. ................................................. 180/79.1,
  244/77
[51] Int. Cl. .................................................... B62d 5/04
[56] References Cited
 UNITED STATES PATENTS
 2,248,251 7/1941 Reeves ........................ 180/79.1
 3,280,931 10/1966 Cahill et al. .................. 180/79.1 X Primary Examiner—A. Harry Levy
Attorney—Wofford and Felsham ABSTRACT: This specification discloses a system for steering a wheeled vehicle characterized by employing, in addition to two steerable wheels attached to the vehicle frame, steering means for separately steering each steerable wheel within a portion of a circle in response to a steer signal; two sensing-comparators, each connected with one of the wheel steering means and operable to generate a steer signal in response to a primary control signal or a follower response signal and to discontinue the steer signal when the associated wheel has been steered through the number of degrees equivalent to the respective signal; actuator means for starting a turn by generating a turn signal; selector means connected with the actuator means and operable, in response to the turn signal, to select one of the wheels as a primary steerable wheel and to impart to the associated controller means the turn signal; controller means connected with the selector means and operable to impart to the sensing-comparator means associated with the primary steerable wheel and to a programmer-follower a primary control signal that is a function of the turn signal; a programmer-follower connected with the controller means and operable to generate and impart to the sensing-comparator means on a secondary steerable wheel; that is, the other of the two steerable wheels; a follower response signal related to the primary control signal as the number of degrees of rotation of a first focal point of a driven ellipse is related to a number of degrees of rotation of the opposite focal point of a driving ellipse rotating twice the number of degrees the primary steerable wheel is steered; the ellipse being identical, being tangential such that their focal points on their major axes form the four apices of a rectangle at the position equivalent to 0° of steer, having a first set of two of the focal points opposite, disposed a fixed distance apart and located at points fixed in space, and having the other two of the focal points opposite and in fixed spaced relation but free to move in space.

The specification also describes a method of steering a vehicle, employing the unique follower response signal output from the programmer.

PATENTED JUN 22 1971
3,586,117
SHEET 1 OF 4
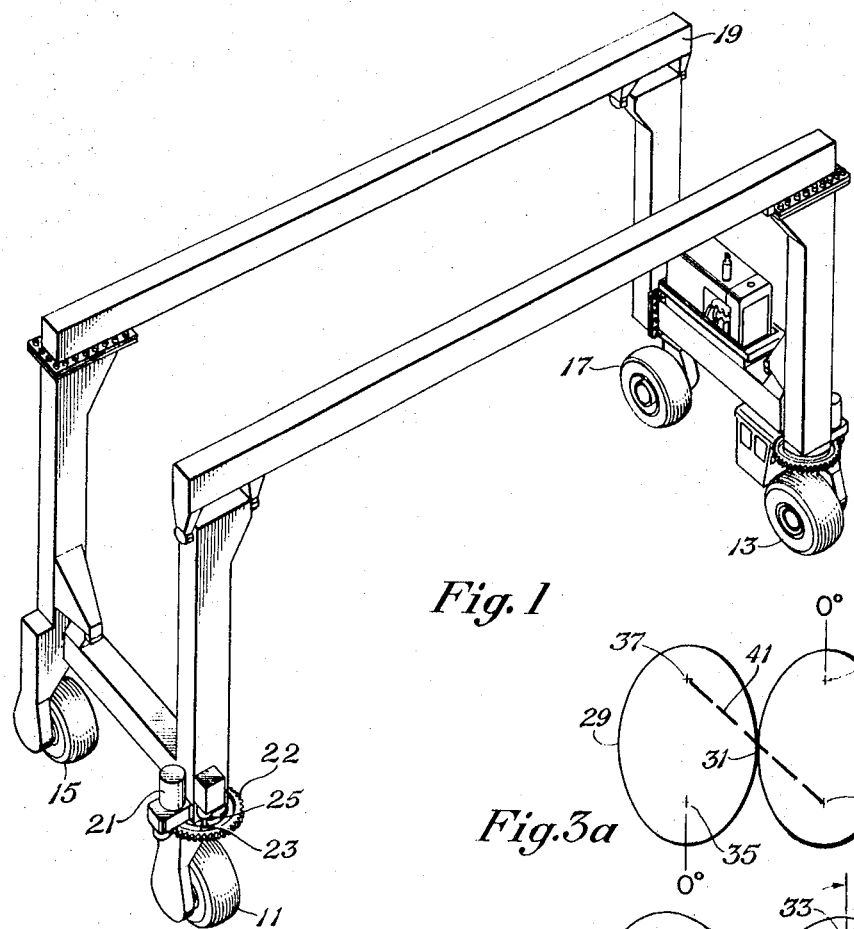
Fig.1
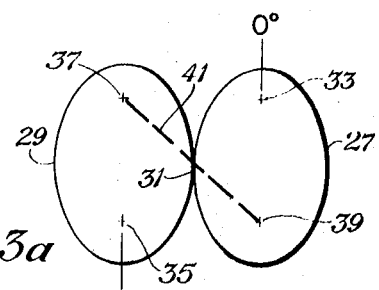
Fig.3a
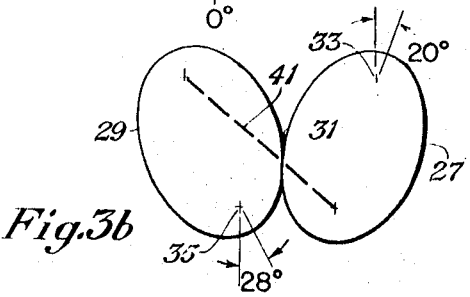
Fig.3b
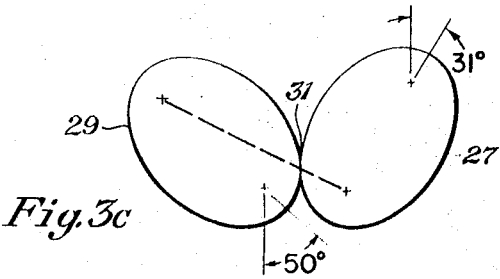
Fig.3c
Fig.2
INVENTOR.
Ted L. LeTourneau
BY
Wofford & Felsman
ATTORNEYS

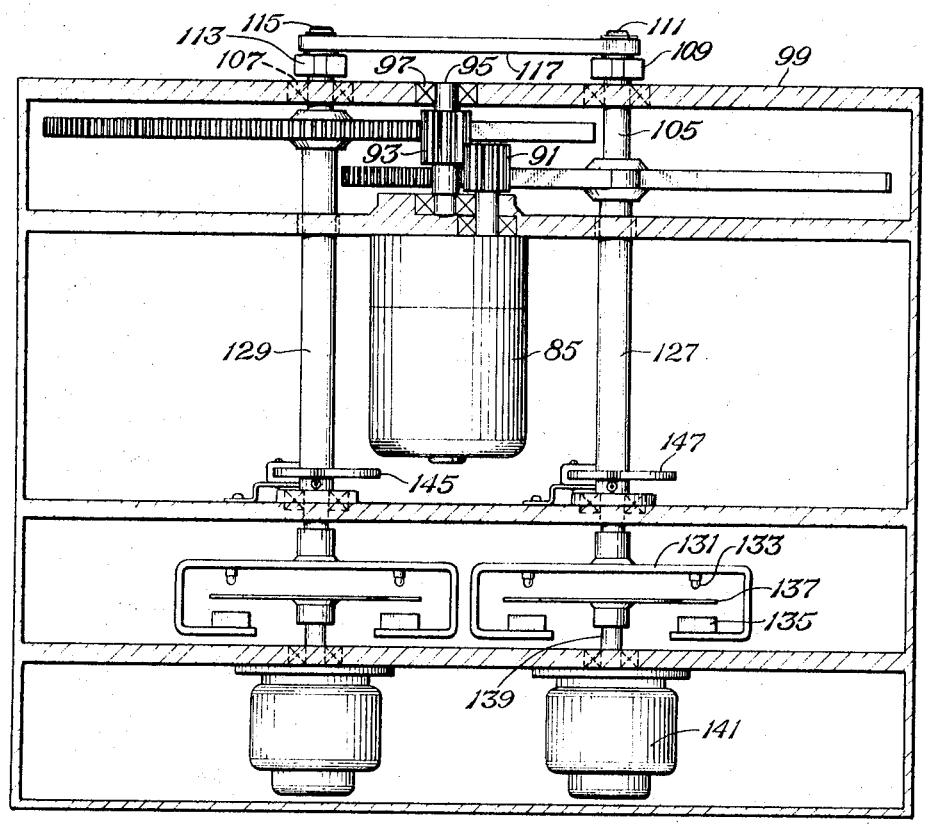
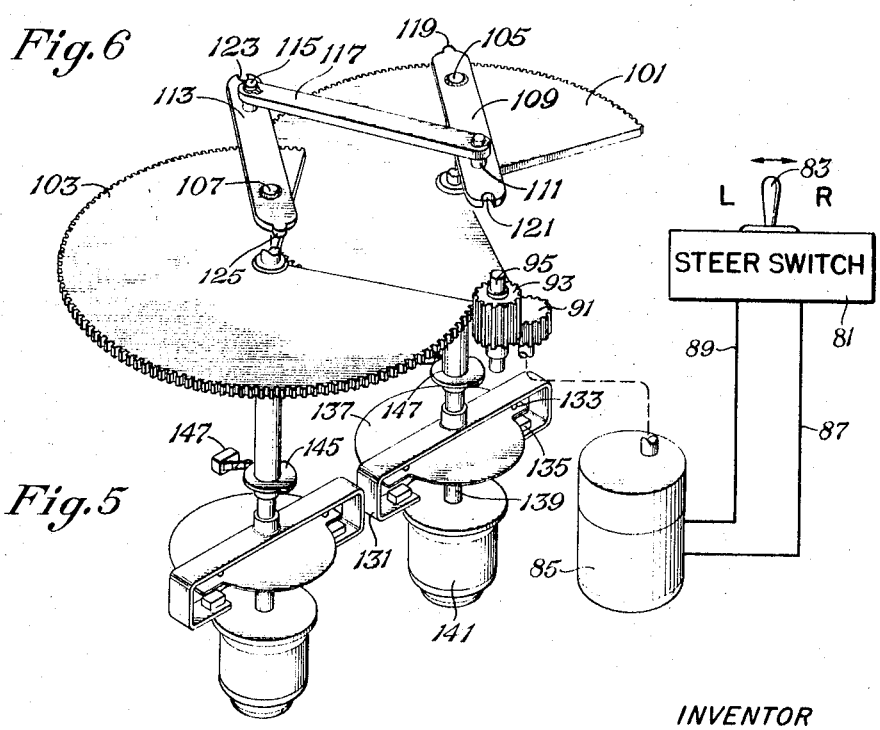
Fig. 6
Fig. 5
INVENTOR
Ted L. LeTourneau
BY
Wofford & Felsman
ATTORNEY

METHOD AND SYSTEM FOR STEERING A VEHICLE

This application is a continuation of my application, Ser. No. 768,998, filed Oct. 21, 1968, and which has since become abandoned.

BACKGROUND

1. Field of the Invention

The invention relates to a system for steering a wheeled vehicle. More particularly it relates to a system effecting differential steering to widely separated, individually steerable wheels.

2. Description of the Prior Art

The prior art has recognized that in order to obtain perfect steering without drag or slippage on one of the steerable wheels, it is essential that different degrees of steer be imparted to the inside wheel on the turn as compared with the outside wheel on a turn.

The conventional method of achieving the different degrees of steer that must be imparted to the inner and the outer steerable wheels is by means of a mechanical tiebar and drag link assembly oriented in the correct position to compensate for this difference in steer. While the tiebar and drag link assembly are employed in conventional vehicles, they are not suitable for many large load-carrying vehicles having widely spaced, individually steerable wheels; and particularly, are not applicable to those carrying underslung loads such as the mobile type Gantry cranes. Since the space between the wheels must be free and clear of any obstruction to handle cargo therein, the tiebar and drag link assembly cannot be employed without use of large and rigid mechanical levers being brought up the legs of the Gantry crane. Moreover in such heavy vehicles the force attending imperfect steerage is often great enough to cause structural damage, instead of merely dragging the tires on the pavement.

The prior art solutions attempting to solve the problem have employed hydraulic cylinder movement in conjunction with multiple and complex linkage arrangements to effect differential hydraulic fluid flow to one of the steerable wheels as compared with the other. Other attempts to solve the problem have invoked the use of four wheel steering, each wheel individually steerable through 360° of rotation and requiring elaborate means for maintaining the proper interrelationship between the four wheels. None of the prior art solutions have been satisfactory in providing a simple, economical method or system for effecting a nearly perfect turn by a large vehicle having widely spaced, individually steerable wheels.

BRIEF DESCRIPTION OF THE DRAWINGS

FIG. 1 is a perspective view of a portion of a wheeled vehicle advantageously employing the invention.

FIG. 2 is a design illustration schematically showing the location and maximum degrees of steer of separately steerable wheels to effect a turn about the midpoint of a line connecting two nonsteerable wheels of a vehicle.

FIGS. 3a, 3b, and 3c are diagrams of tangential ellipses illustrating the principles employed in the invention.

FIG. 5 is a perspective view, partially schematic, of a portion of the system employed in the embodiment of FIG. 4.

FIG. 6 is a cross-sectional view of a portion of the system illustrated in FIG. 5.

DESCRIPTION OF SPECIFIC EMBODIMENTS

Figure 4:
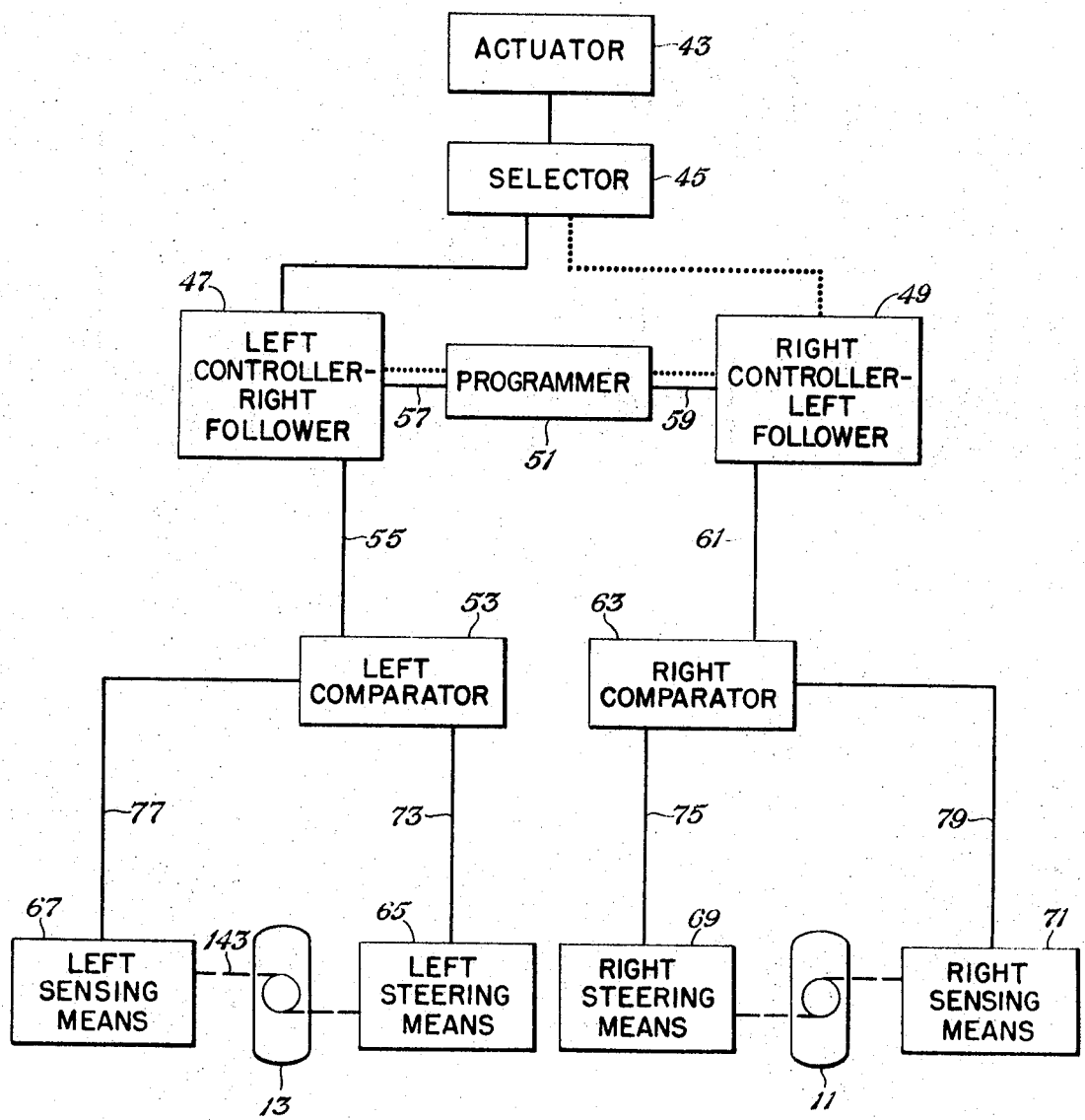
FIG. 4 is a block diagram illustrating schematically one embodiment of the invention.

Applicant has discovered that a unique ellipsoidal program will describe the degrees of steer required to be imparted to two steerable wheels on a wheeled vehicle to very nearly effect a perfect turn. The unique ellipsoidal program operates on the principle that identical ellipses, designed for the vehicle in accordance with particulars described hereinafter, placed tangential such that their focal points on their major axes form the four apices of a rectangle, having a first set of opposite focal points disposed a fixed distance apart and located at points fixed in space, and having a second set of opposite focal points maintained in fixed spaced relationship but movable in a plane to effect a number of degrees of rotation of the driven ellipse which is twice the number of degrees of steer required to be imparted to a secondary steerable wheel when the driving ellipse is rotated twice the number of degrees of steer to be imparted to a primary steerable wheel. Therefore, Applicant employs in a steering system a unique ellipsoidal programmer which operates upon a primary control signal employed to steer a primary steerable wheel to effect a follower response signal to steer a secondary steerable wheel; that is, the other of the two steerable wheels; by carrying out the unique ellipsoidal program.

Thus, in accordance with the invention, a wheeled vehicle having two separately steerable wheels, each having a sensing-comparator in association therewith is steered by the method consisting essentially of the steps of:

a. generating a turn signal to effect a turn;

b. selecting one of the wheels and the sensing-comparator associated therewith to be a primary wheel and a primary sensing-comparator for the duration of the turn;

c. generating and imparting to the primary sensing-comparator a primary control signal that is a function of the turn signal;

d. sensing the primary control signal and in response thereto generating in accordance with the unique ellipsoidal program and imparting to the other of the sensing-comparators a follower response signal; that is, a signal which is related to the primary control signal as the number of degrees of rotation of a first focal point of a driven ellipse is related to a number of degrees of rotation of the opposite first focal point of a driving ellipse rotating twice the number of degrees that the primary wheel is steered; the ellipses being identical, being placed tangential such that their focal points on their major axes form the apices of a rectangle at the position equivalent to zero degrees of steer, having a set of first and opposite focal points disposed a fixed distance apart and located at points fixed in space, and having their other, respective, and opposite focal points on their major axes in fixed spaced relationship but free to move in a plane;

e. steering the primary steerable wheel through a number of degrees that is a function of the primary control signal; and f. steering the other steerable wheel through a number of degrees that is the function of the follower response signal.

In accordance with another embodiment of the invention, there is provided a steering system for use in a wheeled vehicle comprising:

a. a vehicle frame;

b. two wheels attached to the frame and separately steerable, either of which may be a primary steerable wheel or a secondary steerable wheel;

c. two steering means each connected, respectively, with one of the wheels and operable to steer that wheel within a portion of a circle in response to a steer signal;

d. two sensing-comparators each connected, respectively, with one of the wheels and with one of the steering means and operable to generate a steer signal in response to a primary control signal or a follower response signal and operable to discontinue the steer signal when the wheel has been steered through the number of degrees that is a function of, respectively, the primary control signal or a follower response signal;

e. actuator means for actuating a turn by generating a turn signal;

f. selector means connected with the actuator means and operable, in response to the turn signal, to select one of the wheels as a primary steerable wheel for the turn and to impart to the controller means the turn signal, g. controller means frame; with the selector means and operable to impart to the sensing-comparator means associated with the primary steerable wheel and to a programmer-follower a primary control signal that is a function of the turn signal;

h. a programmer-follower connected with the controller means and operable to generate and impart to the sensing-comparator means on the secondary steerable wheel a follower response signal in accordance with the unique ellipsoidal program.

In operation, the invention is employed in turning a vehicle such as illustrated in FIG. 1. Therein, wheels 11 and 13 are individually steerable whereas wheels 15 and 17 are not. The wheels are maintained widely separated by frame 19 providing space and handling apparatus between the wheels to facilitate handling of cargo, the specific cargo handling apparatus not being shown since it is well known and does not form a part of this invention. Each of the steerable wheels 11 and 13 has a steering means such as steering motor 21 engaging a steering gear 22 and operable to effect a desired degree of steer within a portion of a circle. Similarly, each of the steerable wheels has a position sensor 23 and a selsyn transmitter 25 for, respectively, sensing the degrees of steer imparted to the wheel and transmitting to a selsyn receiver a signal which is unique for each position of the wheel.

With a vehicle such as illustrated in FIG. 1, the shortest turning radius is effected if the vehicle rotates about the midpoint of an imaginary line drawn between the nonsteerable wheels. Thus, employing a design scale model similar to the one illustrated in FIG. 2, the maximum angle $\alpha$ through which the outside wheel will be required to steer and the maximum angle $\beta$ through which the inside wheel will be required to steer can be determined. As used herein, maximum angles refer to selected maximum angles to effect a turn about a particular point; such as, the midpoint of a line between nonsteering wheels. Specifically, for a vehicle 20 feet long and 27½ feet wide the angle $\alpha$ will be 55° and the angle $\beta$, which is a supplement of $\alpha$, is 125°. These maximum angles of steer are significant in designing the programmer, as discussed hereinafter. FIG. 2 shows that the wheels are normal to a line drawn from the midpoint of an imaginary line between the nonsteerable wheels and therefore the vehicle will turn in a circle with the center of the circle being the midpoint of the imaginary line between the nonsteering wheels.

These maximum angles, $\alpha$ and $\beta$, determine the characteristics of the identical tangential ellipses which form the basic principle upon which the invention is based. While the major axes for the identical ellipses may be arbitrarily chosen, the distance between the focal points on the major axes is the length of the major axes multiplied by the cosine of the angle $\alpha$. Similarly the length of the minor axes is the length of the major axes multiplied by the sine of $\alpha$.

FIGS. 3a, 3b, and 3c illustrate the principle upon which Applicant's invention is based. Therein, identical ellipses 27 and 29 are placed tangential at point 31, such that the focal points on their major axes form the four apices of a rectangle at the position equivalent to 0° of steer of the steerable wheels of the vehicle illustrated in FIG. 1. Ellipses 27 and 29 are rotatable about their respective opposite focal points 33 and 35. Focal points 33 and 35 are disposed a fixed distance apart and are fixed in space. Ellipses 27 and 29 have their other, respective, focal points 37 and 39 along their major axes maintained in fixed spaced relationship as illustrated by dashed line 41 but free to move in their plane of rotation.

When ellipse 27 is rotated about its focal point 33 through a number of degrees; for example 20° as shown in FIG. 3b, ellipse 29 is rotated about its focal point 35 28° to retain tangential point of contact 31. Applicant has discovered that the relationship of the degrees of rotation; namely, 20° for ellipse 27 and 28° for ellipse 29; is the same as, but twice as large in magnitude as, the degrees of steer that must be imparted respectively to the outer wheel and the inner wheel in making a turn having a large radius with a vehicle having the dimensions illustrated in FIG. 2.

Similarly, as illustrated in FIG. 3c when ellipse 27 is rotated through a larger angle such as the 31°, ellipse 29 is rotated through a much larger angle of 50° and these respective degrees of rotation are twice the degrees of steer that must be imparted, respectively, to the outer wheel and the inner wheel when the vehicle is turned at a sharper rate of turn.

It is apparent from FIGS. 3a—3c that linkage equivalents can be employed to replace the ellipses. For example, ellipse 27 can be replaced by a rigid connection means, or rigid connection, between fixed focal point 33 and the other focal point 39 on the major axis. Similarly, ellipse 29 can be replaced by a rigid connection between fixed focal point 35 and the other focal point 37 on the major axis. A linkage is employed as illustrated by dashed line 41 to maintain connecting means representing moveable focal points 37 and 39 the same distance apart so as to retain the equivalent of a tangential point between the ellipses.

In order for the relationship of the ellipses to continue to be the same as for the inside and outside steerable wheels on the vehicle making the turn, the fixed focal points 33 and 35 must be opposite focal points and not adjacent; that is, they must not be on the same side of the lever equivalent to dashed line 41. Yet it is apparent that, in extrapolating the trend illustrated in FIGS. 3a—3c, dashed line 41 will ultimately align moveable focal points 37 and 39 with fixed focal point 35. This position is referred to as dead center position. From this dead center position further turning of ellipse 27 could cause the lever equivalent to dashed line 41 to move back in the direction whence it came. In this way fixed focal point 33 would be on the same side as fixed focal point 35 and no longer be opposite focal points, in which case the relationship breaks down. It is imperative, therefore, that a means be provided to move the ellipses, or their equivalents, from a dead center position such that the fixed focal points are maintained as opposite focal points rather than adjacent focal points It is readily apparent that if gear teeth are employed about the periphery of the ellipses, no problem is encountered in this regard. Similarly, if gears are employed at the respective ends of the ellipses such that they mesh at the dead center position the problem is alleviated since rotation of one ellipse insures counterrotation of the other. Applicant has found that it is not necessary to use multiple gear teeth on the linkage equivalent of each ellipse, but that a single meshing means may be attached to the rigid connections and located at the point equivalent to the maximum dimensions of the major axis of each respective ellipse and move the rigid connections from the dead center position to maintain the fixed focal points as opposite focal points; similarly, maintaining connecting means holding the lever equivalent to dashed line 41 as opposite focal points also.

One embodiment of the invention is illustrated by the block diagram of FIG. 4. Therein actuator means 43 is connected with selector means 45. Actuator means 43 is employed to initiate a turn of the vehicle and indicates whether a steer to the left or to the right is indicated. Signal is passed to the selector means 45 which discriminates the left or right signal to select which one of the steerable wheels 11 and 13 is to be the primary steerable wheel for the duration of the particular turn. The other steerable wheel is thus relegated to a secondary steerable wheel. Selector means 45 is connected with two controller-follower means, one being designated left controller-right follower 47 and the other being designated right controller-left follower 49. The controller-follower means are each connected with programmer 51. Selector means 45 transmits the turn signal to the same controller as the wheel selected as the primary steerable wheel. As illustrated by the solid line from selector means 45 to left controller-right follower 47, the left steerable wheel has been selected as the primary steerable wheel and the turn signal transmitted to the left controller-right follower 47. Left controller-right follower 47 then transmits a primary control signal that is a function of the turn signal to the left comparator 53 via signal conductor means 55 and to programmer 51 via interconnection 57.

Programmer 51 operates on the primary control signal in accordance with the unique ellipsoidal program and effects the proper follower response signal which it sends via second interconnection means 59 to right controller-left follower 49. Right controller-left follower 49 transmits the follower response signal via second signal conductor means 61 to right comparator 63.

Left comparator 53 is connected with left steering means 65 and left sensing means 67 associated with left steerable wheel 13. Similarly, right comparator 63 is connected with right steering means 69 and right sensing means 71 associated with right steerable wheel 11.

Thus, left comparator 53 sends a steer signal to left steering means 65 via steer signal conductor 73. Simultaneously, right comparator 63 sends a steer signal to right steering means 69 via second steer signal conductor 75. To afford feedback information, left sensing means 67 senses the degrees of steer through which wheel 13 has been turned and sends this information back to left comparator 53 via feedback signal conductor 77.

Right sensing means 71 senses the degrees of steer through which steerable wheel 11 has been steered and sends this information back to right comparator 63 via second feedback signal conductor 79. Once wheel 13 has been steered through the number of degrees that is functionally equivalent to the primary control signal, left comparator 53 terminates the steer signal to left steering means 65. In like manner, once wheel 11 has been steered through the number of degrees that is functionally equivalent to the follower response signal, right comparator 63 terminates the steer signal to the right steering means 69. Steerable wheels 11 and 13 retain the degrees of steer imparted thereto until another turn signal is initiated by actuator means 43. Selector means 45, however, maintains the same wheel as the primary steerable wheel until the wheels are returned to 0° of steer, also referred to as neutral position. Consequently, when actuator means 43 begins to finish the turn by actuation of a return to 0° of steer, selector means 45 continues to feed the signal from the actuator means 43 to left controller-right follower 47. In response thereto, left controller-right follower 47 sends a primary control signal indicating an opposite direction of steer to left comparator 53 and programmer 51. As before, programmer 51 operates upon the primary control signal in accordance with the unique ellipsoidal program and sends the proper follower response signal to right controller-left follower 49. Right controller-left follower 49 sends the follower response signal, indicating an opposite direction of steer to that originally sent, to right comparator 63 via second signal conducting means 61.

The sequence of operations in returning to 0° of steer, or any other indicated position intermediate the original turn indication and 0° of steer is effected in the same way described hereinbefore with respect to the original turn.

Once 0° of steer have been reached and a turn in the opposite direction is initiated by actuator means 43, selector 45 selects the opposite wheel as the primary steerable wheel. Consequently, as illustrated by the dotted line, selector means 45 transmits the turn signal to right controller-left follower 49. Thereafter the sequence of operations is, in principle, the same although the converse of those described with respect to the original turn. Specifically, right controller-left follower 49 sends a primary control signal to right comparator 63 and to programmer 51. Programmer 51 operates upon the primary control signal in accordance with the unique ellipsoidal program to effect and transmit to the left controller-right follower 47 the proper follower response signal.

As described before, the respective comparators generate and transmit the proper steer signals until the wheel is steered, and the sensing means feeds back the information that the wheel is steered through the proper number of degrees. The steer signals are then terminated. Further steering is carried out in accordance with one of the modes described hereinbefore; namely, further steering in the same direction, a return to neutral, or further steering from neutral position.

The vital operation of the unique ellipsoidal programmer in conjunction with the other elements of the invention can be clearly seen in FIGS. 5—9 illustrating in detail one embodiment of the invention. Referring to FIG. 5 actuator means 43 may comprise steer switch 81 having a toggle bar 83 mounted on the operator's console and adapted to generate a left steer signal when moved in one direction and for generating a right steer signal when moved in another direction. Steer switch 81 is connected with reversible electric motor 85 by electrical conductors 87 and 89. Electric motor 85 is physically connected with drive gear 91 and operable to rotate drive gear 91 while motor 85 remains fixed. Drive gear 91 engages idler gear 93 mounted adjacent thereto on idler shaft 95 and bushings 97, FIG. 6. Frame subunit 99 maintains the integrity of the subassembly and affords mounting points for the various units as well as the bushings for the various shafts. At the position equivalent to 0° of steer, drive gear 91 engages at least a single tooth of sector gear 101 serving as one of the controller-follower means; and similarly idler gear 93 engages at least a single tooth of second sector gear 103 serving as the other of the controller-follower means.

First shaft 105 serves as a fixed focal point 33 for the equivalent of ellipse 27. Similarly, second shaft 107 serves as fixed focal point 35 for the equivalent of ellipse 29. Shaft 105 is connected so as to rotate with sector gear 101 and shaft 107 is connected so as to rotate with sector gear 103. Shaft 105 has a rigid connection means; such as lever 109; with a first connecting means; such as pin 111; located at the point in space that is equivalent to the other focal point 39 on the major axis of ellipse 27. Similarly shaft 107 has a rigid connection means; such as second lever 113; with a second connecting means; such as second pin 115; located at the point in space that is equivalent to the other focal point 37 on the major axis of the ellipse 29. Pins 111 and 115 are connected by bar 117 and are maintained the same distance apart as levers 109 and 113 are rotated about their respective shafts 105 and 107. While this linkage arrangement between levers, pins, and shafts is sufficient to negotiate turns requiring low degrees of steer, it is imperative that meshing means be provided in the linkage arrangement simulating the ellipses where large degrees of steer are to be imparted to one or more of the wheels, as described hereinbefore. Therefore, meshing means; such as tooth 119 and notch 121; are provided on the extension of lever 109 and located in space equivalent to the maximum dimensions of the major axis of the ellipse being simulated. Similarly, the converse meshing means are provided on lever 113 by notch 123 and tooth 125. In this way, the meshing means move the rigid connections from the dead center position and maintain the proper relationship of the linkages in which shafts 105 and 107 remain as simulating opposite focal points. To engage properly, the meshing means have an equivalent radius that is equal to the equivalent ellipse major axis multiplied by $(\sin\alpha)^2$.

Shafts 127 and 129 serve as the respective signal conductor means from the controller-follower means. Attached to shafts 127 and 129 and rotatable therewith are the respective comparators which comprise holder 131 with two U-shaped ends, each having affixed thereto a light source 133 and an electronic device 135 rendered conductive by the impingement of light thereupon. While the electronic device 135 may be any of the photosensitive cells, it is preferred that it be a solid state device which is rendered conductive when light from light source 133 impinges thereupon. Electronic device 135 is connected in a circuit with a source of power and with the steering means for one of the steerable gears. The circuit itself is not shown in order to simplify presentation and since such circuits are well known. Interposed between light source 133 and electronic device 135 on the U-shaped ends of holder 131 is indicator plate 137, comprising a circular plate having an opaque portion operable to interrupt impingement of light from light source 133 on electronic device 135, but having a cutaway portion which allows light to be transmitted from light source 133 to electronic device 135. As indicated, to permit operability regardless of the direction of steer, holder 131 has two light sources and two electronic devices and indicator plate 137 extends through an entire 360° range. The cutaway portion extends through slightly less than 180°, whereby the indicator plate blocks the light from both electronic devices at equilibrium; i.e., when the respective wheels have the correct degrees of steer; but transmits the light to one electronic device or the other to indicate a particular direction of steer at nonequilibrium conditions; e.g., when a wheel does not have the correct degrees of steer as when the holder is rotated.

Indicator plates 137 are mounted upon their respective shafts; such as shaft 139; and adapted to assume a slave position in response to a slave selsyn receiver 141. The slave selsyn receivers, illustrated as 141, are connected with selsyn transmitters; such as 25, FIG. 1; and adapted to assume a slave position for each unique signal from the selsyn transmitter. Selsyn transmitter 25 is connected with position sensor 21 at a steerable wheel and adapted to transmit a unique signal for each position indication of the position sensor. Indicator plate 137, however, moves through twice the number of degrees of rotation equivalent to the number of degrees of steer of the particular steerable wheel to which it is ultimately enslaved. Together, indicator plate 137, selsyn transmitter 25 and selsyn receiver 141, position sensor 23, and the interconnection means therebetween comprise sensing means 67, feedback signal conductor 77, and mechanical interconnection 143 between the wheel 13 and left sensing means 67 in FIG. 4.

Figure 8:
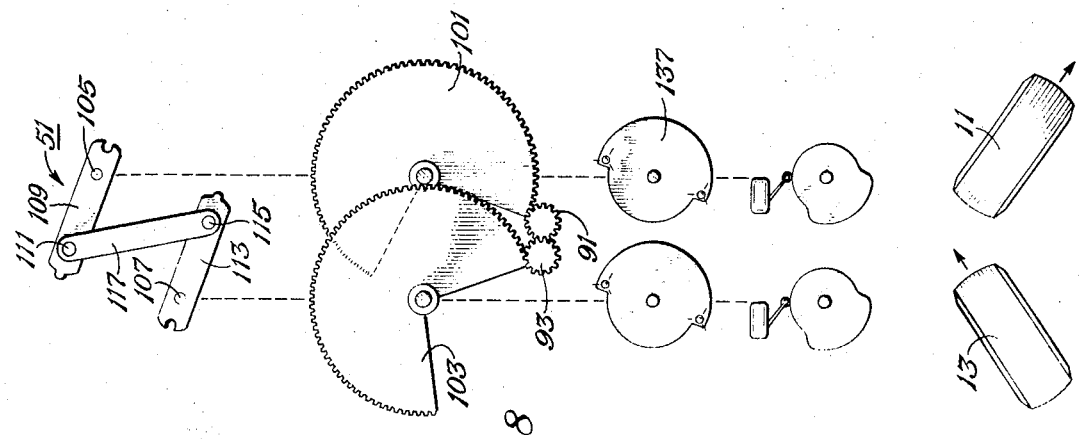
FIGS. 7, 8 and 9 are pictorial views selected to illustrate schematically the interrelationships of significant parts of the system employed in one embodiment of the invention.
Figure 7:
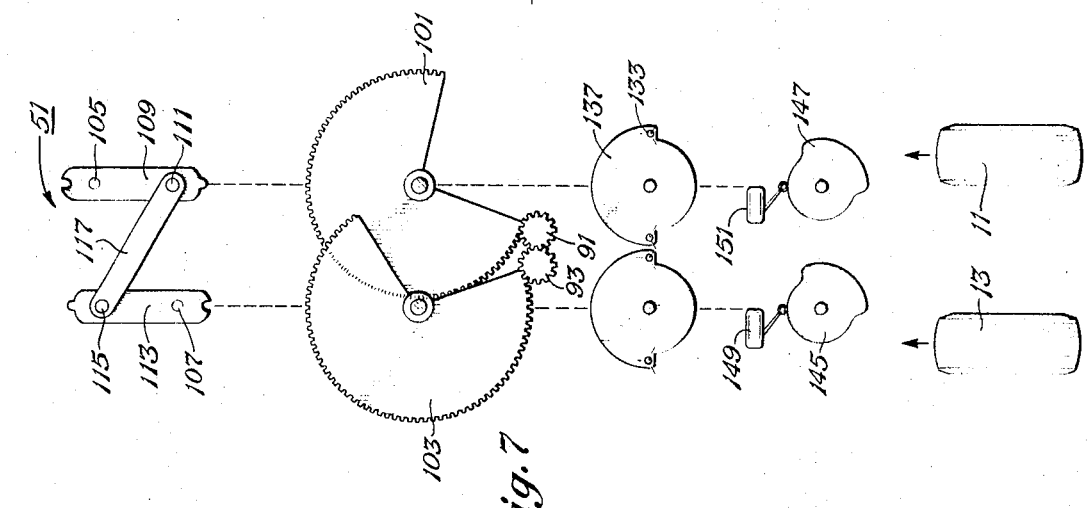
Figure 9:
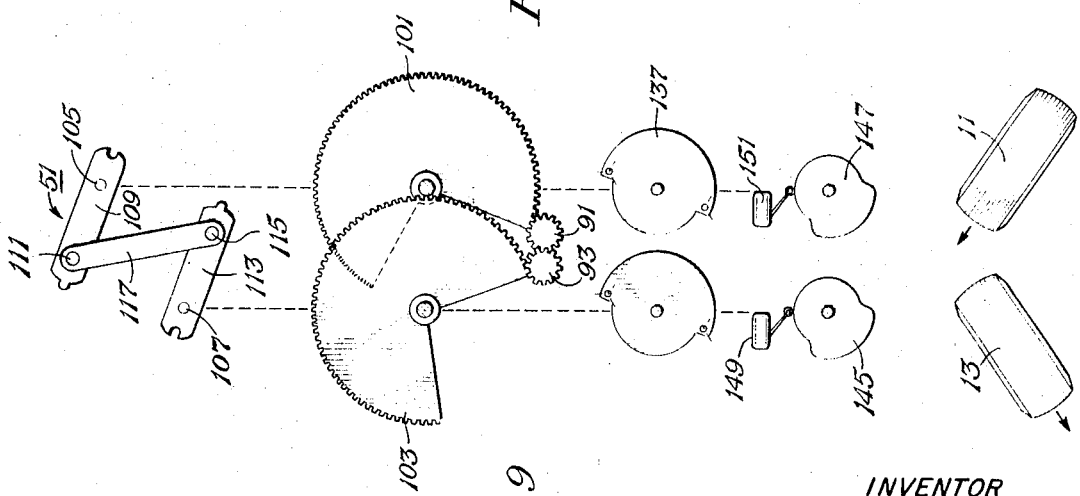

For additional clarity, FIGS. 7, 8, and 9 have been provided to illustrate the coaction between the elements and their respective positions for the embodiment and example described hereinbefore, during positions of, respectively, 0° of steer, maximum degree of steer to the right, and maximum degrees of steer to the left.

In FIG, 7 showing the neutral position, drive gear 91 meshes with idler gear 93 and engages a single tooth of sector gear 101. Idler gear 93 engages a single tooth of sector gear 103. In the unique ellipsoidal programmer 51, levers 109 and 113, representing the major axes of their respective ellipses are parallel at this position of 0° of steer of the respective steerable wheels 11 and 13, and shafts 105 and 107 and pins 111 and 115 form the apices of a rectangle. In this position, the opaque portion of indicator plates 137 block the light from light sources 133 such that the electronic devices (not shown) are not conductive an no steer signal is imparted to the wheels.

Referring to FIG. 8 and assuming that it is desired to turn the vehicle illustrated in FIG. 2 such that the vehicle rotates about the midpoint of an imaginary line between the nonsteerable wheels, the steer switch 81, FIG. 5, is activated to the right position. Reversible motor 85, FIG. 5, turns drive gear 91 which in turn rotates idler gear 93 in the opposite direction. In this example the selector means will choose the right steerable wheel 11 as the primary steerable wheel. Therefore, drive gear 91 rotates clockwise, engaging sector gear 101 and rotating it in a counterclockwise direction.

Once sector gear 101 begins to rotate, holder 131 is also rotated such that light from the light source impinges upon the electronic device effecting a steer right signal to the right wheel 11, which is the primary steerable wheel for the duration of this turn and which must be turned to the maximum angle $\alpha$ of 125°. Sector gear 101 is rotated through twice the number of degrees that wheel 11 will be required to steer. Expressed otherwise, sector gear 101 will rotate through 250°.

As soon as drive gear 91 rotates sector gear 101, idler gear 93, turning in the opposite direction, disengages from sector gear 103 leaving it free to respond to rotational signals from the programmer 51.

Simultaneously, shaft 105 effects rotation of lever 109. Bar 117 transmits this rotational force from shaft 105, serving through its linkage arrangement as the equivalent of ellipse 27, to impart rotation via lever 113 to shaft 107. The rotation imparted to shaft 107 will be less, however, than the rotation of shaft 105. Sector gear 103, having disengaged from idler gear 93 is free to rotate in response to urging of lever 113 and in turn rotates its holder effecting a steer right signal since opaque portion of its indicator plate no longer blocks impingement of light from the light source upon the electronic device carried in the holder and effecting a steer right signal. Consequently, from the holder, acting as a comparator, the steer right signal is sent to steering motor and wheel 13 is steered to the right.

The steer right signals continue to be sent to the respective gears until they have been steered to the number of degrees indicated by the comparator; that is, the position of the holders. In order to determine when this has been accomplished, feedback information is given from each wheel by the position sensor whose position is transduced into a unique signal and transmitted by the selsyn transmitter to the slave selsyn receiver associated therewith. The slave selsyn receiver positions its indicator plate to a position equivalent to the number of degrees of steer of the respective wheels. Thus, when the maximum number of degrees of steer has been accomplished as illustrated in FIG. 8, indicator plates 137 for the respective holders again block, through their opaque portion light from light sources 133 and render nonconductive electronic devices 137. This terminates the steer signal. In FIG. 8 it can be seen that sector gear 101 will have rotated counterclockwise through 250° but is still retained in engagement with drive gear 91 by one tooth, as it initially engaged drive gear 91. Similarly, sector gear 103 which is operated as a follower responding to rotational urging from programmer 51 is rotated without the toothed portion of the sector gear engaging idler gear 93, but when the maximum degree of steer has been imparted one tooth again engages idler gear 93. In this way the selector retains the same wheel as the primary steerable wheel even though the actuator, or steer switch 81, may be moved to the left to start the turn to 0° of steer.

When the steer switch is moved to the left, the reversible electric motor 85 rotates in the opposite direction, rotating drive gear 91 in the opposite direction to its original direction. Thus, drive gear 91 is rotated counterclockwise, effecting clockwise rotation of sector gear 101 and idler gear 93. The clockwise rotation of idler gear 93 disengages from the tooth of sector gear 103, which is again free to rotate in response to torque applied from programmer 51. The reverse rotation of sector gear 101 moves its holder 131 in the opposite direction, whereby the light source clears the opaque portion of indicator plate 137 and activates the electronic device effecting a signal to steer in the opposite direction to the steering motor at wheel 11.

In the reverse operation sector gear 103 is rotated through the missing portion, which happens to be 110°, or twice the angle $\alpha$ to which the outside wheel is to be steered. Once the holder attached to shaft 129 of sector gear 103 is rotated, the light source moves beyond the opaque portion of its indicator plate and renders conductive its electronic device. This effects a steer left signal to the steering motor which steers wheel 13 back toward a neutral position.

FIG. 9 illustrates the converse of the situation of FIG. 8 in which the maximum degree of steer to the left is effected to turn the vehicle illustrated in FIG. 2 in a circle about the midpoint of the line between the nonsteerable wheels. Again, steer switch 81 has its toggle moved to the left position effecting rotation of reversible motor 85. Motor 85, in turn, effects rotation of drive gear 91, this time in a counterclockwise direction. Idler gear 93 engaged therewith is thus rotated in a clockwise direction as is sector gear 101. As shown however sector gear 101 rotates through only one tooth before it disengages leaving it free to respond to the rotational urging from programmer 51. Idler gear 93 rotates sector gear 103 counterclockwise. Once sector gear 103 rotates, its holder is rotated and light from its light source renders conductive its electronic device signaling a steer left to wheel 13 which has been selected as the primary steerable wheel for a turn to the left.

In this turn to the left, shaft 107 serves as the focal point for the driving ellipse and rotates lever 113. The other focal point on the major axis, designated pin 115 transmits the force via bar 117 to lever 109, effecting rotation of shaft 105 and consequently rotation of sector gear 101. Once sector gear 101 is rotated holder 131 is rotated. Consequently, light from its light source moves off the opaque portion of indicator plate 137 and signals a steer left signal to wheel 11.

As previously described, the steer signal is continued until the steering motor has turned the respective wheel one-half the number of degrees rotated by the holder. Once these number of degrees have been effected, as indicated by the position sensor, selsyn transmitter, selsyn receiver and indicator plate, the steer signal is terminated. The extreme position of turn is indicated in FIG. 9 in which sector gear 103 has turned through 250°, effecting 125° of steer to wheel 13 which in turn effects slave rotation of the indicator plate through 250°. Sector gear 103 retains one tooth in engagement with idler gear 93.

Responsive to the rotational urging from programmer 51 sector gear 101 has rotated through its free space of essentially 110°, effecting 55° of steer to wheel 11. Sector gear 101, in its ultimate position of extreme left steer engages one tooth with drive gear 91.

As previously discussed with respect to the turn to the right, the selector means retains the same wheel as the primary steerable wheel even though the steer switch may be moved to the right position to return the wheels to neutral. To do so, steer switch has its toggle 83 moved to the right, actuating reversible electric motor 85 and rotating drive gear 91 clockwise. This effects counterclockwise rotation of idler gear 93 and disengagement of sector gear 101 with drive gear 91. Counterclockwise rotation of idler gear 93 effects clockwise rotation of sector gear 103, generating a steer right signal to wheel 13 which has been retained as the primary steerable wheel. In the manner indicated hereinbefore, sector gear 101 is rotated in response to urging from programmer 51 and generates a steer right signal, effecting a steer to the right for wheel 11, the secondary steerable wheel. The steer signals continue in this way, until neutral position is again achieved.

In the event a continued turn is to be effected beyond neutral, the steer signals will continue uninterrupted, even though the selector will select a different steerable wheel to be the primary wheel for this new turn. As can be seen from FIG. 7, however, the sector gears mesh smoothly with either the drive gear or idler gear and the sequence described hereinbefore begins without interruption of the steer signal.

While a turn of vehicle about a point; such as the midpoint of the line between its nonsteerable wheels; can be effected without difficulties from unequal intervals of time required for the inside and outside wheels to reach their maximum degree of steer, applicant has found it advantageous to incorporate a speedup cam to increase the rate at which the degrees of steer are effected in the inside wheel when a vehicle is making a turn with some forward speed. It has been found advantageous to incorporate a cam which effects this higher rate of inducing steer to the inside wheel when the steer range is between about one-fourth and three-fourths $\alpha$, $\alpha$ being the maximum degree of steer to be imparted to the inside wheel. In the vehicle illustrated in FIG. 2, in which $\alpha$ is 125°, degrees, the cam is situated to effect an increased speed between 31° and 93°. When degrees of steer greater than 93° are to be imparted it has been found advantageous to again return to a normal rate of steer to prevent overrun in the degrees of steer imparted because of the inertia of the heavy armature of the steering motor.

The cams for introducing the greater rate of steer to the wheels are shown in FIGS. 5—9 as cams 145 and 147. Thus, when the sector gear representing the primary steerable wheel has been turned through 62°, equivalent to 31° of steer to be imparted to the primary steerable wheel in the examples, the raised lobe on the particular cam will activate a microswitch to effect the higher rate of steer. The respective microswitches are indicated as 149 and 151. Thus, for example, in a turn to the right, once sector gear 101 has rotated 62°, cam 147 depresses microswitch 151 and causes steering motor to speed up and impart a greater rate of steer. It has been found that the greater rate of steer is preferably about four times the normal rate of steer to minimize any forces acting on the wheels due to the time delay in effecting the greater degree of steer to the inside wheel in a turn. The greater rate of steer is maintained by the cam 147 until sector gear 101 has moved through 186° of steer, equivalent to 93° of steer to be imparted to wheel 11.

In the reverse process, the lobe on cam 147 effects the greater rate of steer at 186° of rotation going back down, and maintains it until back down to 62° of rotation of sector gear 101.

Conversely, in a turn to the left cam 145 depresses microswitch 149 at the same degrees of rotation of sector gear 103; namely, 62° and maintains the high rate of steer until 186° of rotation has been effected. In like manner in steering back to the neutral position cam 145 effects the high rate of steer when 186° of rotation is reached and maintains the high rate of steer until 62° of rotation is reached, when again the normal rate of steer is imparted.

It is noteworthy that the comparator provides a self-correcting mechanism. For example, should there be an oversteer because of the inertia of the steering motor, the oversteer would be reflected in the position of the indicator plate which would, at the correct position, block light from the light source to the electronic device effecting the steer signal and then would allow light from the other of the light sources to impinge upon the other of the electronic devices, thereby effecting a steer signal in the opposite direction to correct the oversteer.

The embodiment of the invention illustrated in FIGS. 7—9 has been described with respect to selecting, as the primary steerable wheel, the inside wheel in a turn. In this instance, the primary steerable wheel is steered through a greater number of degrees than the secondary steerable wheel, which is the outside wheel of the turn. The method or apparatus of the invention is equally applicable when the outside wheel of a turn is selected as the primary steerable wheel. The same apparatus may be employed as described hereinbefore. The only change required is that the sector gears are formed with the toothed section being approximately equal in angular dimensions to the blank sector illustrated. To be more exact, the blank sector has a dimension of $2\alpha$ less one tooth for the vehicle illustrated; that is, 110° minus the dimensions of one tooth. On the other hand, when the outside gear is selected as the primary steerable gear, the toothed section of the sector gear will be 110° plus one tooth whereas the blanked sector of the sector gear will occupy 250°, or $2\beta$ in the example illustrated, minus one tooth. It will be immediately apparent that the driving ellipse, which is associated with the primary steerable wheel, will turn through a lesser number of degrees when the outside wheel is the primary steerable wheel than does the driven ellipse associated with the secondary wheel, which would be the inside wheel.

ONe of the advantages of the machine employing a simulation of the unique ellipsoidal programmer is that the rigid connection means, such as lever 109 and bar 117 simulating dashed line 41 are the same length; i.e., the length of the major axis of the ellipse; and can be used for any vehicle. All that must be done is to locate the respective focal points such that the criteria described hereinbefore are satisfied.

The relationship of the angles $\alpha$ and $\beta$ has been illustrated with respect to a simple, symmetrical vehicle with nonsteering wheels. The criteria of design with respect to $\alpha$ and $\beta$ are valid for any given point about which the vehicle is to be steered, regardless of the number of steerable wheels on the vehicle, and whether or not there are nonsteerable wheels on the vehicle.

It will be readily apparent that electrical, hydraulic or mechanical systems, servos and signals can be employed in any combination instead of the specific elements described in detail herein Moreover while the invention has been described with a high degree of particularity, it is understood that the present disclosure has been made only by way of example and that numerous changes in the details of construction and the combination and arrangement of parts may be resorted to without departing from the spirit and the scope of the invention as hereinafter claimed.

What I claim is:

1. A method of steering a vehicle having two separately steerable wheels each having a sensing-comparator, consisting essentially of the steps of:
   a. generating a turn signal to effect a turn of the vehicle;
   b. selecting one of said wheels and the sensing-comparator associated therewith to be a primary wheel and a primary sensing-comparator for said turn;
   c. generating and imparting to said primary sensing-comparator a primary control signal which is a function of said turn signal;
   d. sensing said primary control signal and in response thereto generating and imparting to the other of said sensing-comparators a follower response signal which is related to said primary control signal as the number of degrees of rotation of a first focal point of a driven ellipse is related to a number of degrees of rotation of the opposite first focal point of a driving ellipse rotating twice the number of degrees that the primary steerable wheel is steered; said ellipses being identical, being placed tangential such that their focal points on their major axes form the apices of a rectangle at the position equivalent to 0° of steer, having a set of first and opposite focal points disposed a fixed distance apart and located at points fixed in space, and having their other, respective, and opposite focal points on their major axes in fixed spaced relationship but free to move in a plane;
   e. steering said primary wheel through a number of degrees that is a second function of said primary control signal; and
   f. steering the other wheel through a number of degrees that is said second function of said follower response signal.

2. The method of claim 1 wherein two outside nonsteering wheels are also attached to said frame and said identical ellipses have a distance between the two focal points on each respective major axis of each ellipse that is equal to said major axis multiplied by the cosine of an angle α generated by lines extending from a midpoint between said outside, nonsteering wheels attached to said frame to one of said outside, nonsteering wheels and to the steerable wheel on the same side as said one of said outside, nonsteering wheels and said ellipses have each respective minor axis length that is equal to said major axis length multiplied by the sine of the angle α.

3. The method of claim 2 wherein said primary wheel is the outside wheel on a turn and the driving ellipse rotates through a lesser number of degrees than said driven ellipse.

4. The method of claim 2 wherein said primary wheel is the inside wheel on a turn and said driving ellipse rotates through a greater number of degrees than said driven ellipse.

5. The method of claim 2 wherein said primary wheel is maintained as the primary steerable wheel through steer in the opposite direction of said turn until 0° of steer is again effected.

6. The method of claim 2 wherein a normal rate at which an inside wheel on a turn is steered is increased to a higher rate at an angle between about one-fourth β and three-fourths β, where β is the maximum angle the inside wheel would be required to be steered to effect a turn of said vehicle about the midpoint of a line connecting its nonsteering wheels.

7. The method of claim 6 wherein said higher rate is four times as great as said normal rate.

8. The method of claim 1 wherein said primary wheel is the outside wheel on a turn and the driving ellipse rotates through a lesser number of degrees than said driven ellipse.

9. The method of claim 1 wherein said primary wheel is the inside wheel on a turn and said driving ellipse rotates through a greater number of degrees than said driven ellipse.

10. The method of claim 1 wherein said primary wheel is maintained as the primary steerable wheel through steer in the opposite direction of said turn until 0° of steer is again effected.

11. The method of claim 1 wherein a normal rate at which an inside wheel on a turn is steered is increased to a higher rate at an angle between about one-fourth β and three-fourths β, where β is the maximum angle the inside wheel would be required to be steered to effect a turn of said vehicle about the midpoint of a line connecting its nonsteering wheels.

12. The method of claim 11 wherein said higher rate is four times as great as said normal rate.

13. In a wheeled vehicle, a steering system comprising:
   a. a vehicle frame;
   b. two wheels attached to said frame and separately steerable, either of which may be a primary steerable wheel or a secondary steerable wheel;
   c. two wheel steering means, each connected, respectively, with one of said wheels and operable to steer said wheel within a portion of a circle in response to a steer signal;
   d. two sensing-comparators, each connected, respectively, with one of said wheels and with the one of said wheel steering means associated therewith and operable to generate a steer signal in response to a primary control signal or a follower response signal and operable to discontinue said steer signal when said wheel has been steered through the number of degrees that is functionally equivalent to, respectively, said primary control signal or said follower response signal;
   e. actuator means for actuating a turn by generating a turn signal;
   f. selector means connected with said actuator means and operable, in response to said turn signal, to select one of said wheels as a primary steerable wheel for said turn and to impart to a controller means said turn signal;
   g. controller means connected with said selector means and operable to impart to the sensing-comparator means associated with said primary steerable wheel and to a programmer-follower a primary control signal that is a function of said turn signal;
   h. a programmer-follower connected with said controller means and operable to generate and impart to the sensing-comparator means associated with the secondary steerable wheel a follower response signal related to said primary control signal as the degrees of rotation of a first focal point of a driven ellipse is related to the number of degrees of rotation of the opposite first focal point of driving ellipse rotating twice the number of degrees that said primary steerable wheel is steered; said ellipses being identical, being placed tangential such that their focal points on their major axes form the apices of a rectangle at the position equivalent to 0° of steer, having a set of first and opposite focal points disposed a fixed distance apart and located at points fixed in space, and having their other, respective, and opposite focal points on their major axes in fixed spaced relationship but free to move in a plane.

14. The steering system of claim 13 wherein said programmer employs as the equivalent of said ellipses a first shaft simulating the focal point of said driving ellipse and having rigid connection means with a first connecting means located at the point in space that is equivalent to the other focal point on the major axis of said driving ellipse, and a second shaft simulating the opposite focal point of said driven ellipse and having second rigid connection means with a second connecting means located at the point in space that is equivalent to the other focal point on the major axis of said driven ellipse; said first connecting means and said second connecting means being maintained in fixed spaced relationship but free to move in a plane, and as opposite focal points by a connecting bar;

and meshing means attached to said rigid connection means and located at the points in space equivalent to the maximum dimensions of the major axis of each respective ellipse to move said rigid connection means from dead center position and maintain said shafts as opposite focal points.

15. The steering system of claim 14 wherein the distance between focal points of each respective ellipse and hence the distance between said respective shafts and connecting means is the major axis multiplied by the cosine of an angle $\alpha$ generated by lines extended from a midpoint between outside nonsteering wheels attached to said frame to one of the nonsteering wheels and to the steerable wheel on the same side as said one of said nonsteering wheels, and the minor axis length is the major axis length multiplied by the sine of the angle $\alpha$.

16. The steering system of claim 14 wherein the effective radius of said respective meshing means is equal to the ellipse major axis multiplied by $(\sin \alpha)^2$.

17. The steering system of claim 13 wherein said wheel steering means is an electric motor turning an arrangement of gears connected so as to impart steer to said wheel in response to rotation of said motor.

18. The steering system of claim 13 wherein said actuator consists essentially of a turn switch mounted on an operator's console and adapted for generating a turn left signal when moved in one direction and for generating a turn right signal when moved in another direction; a reversible electric motor electrically connected with said turn switch and operable to rotate in either direction in response to the particular turn signal from said turn switch.

19. The steering system of claim 13 wherein said selector means consists essentially of a drive gear and meshing therewith an idler gear; said drive gear connected with said reversible electric motor of said actuator means and rotatably responsive to torque therefrom and operable to impart torque to one controller means during turn in one direction, initiated from a position of 0° of steer; and said idler gear maintained in engagement with said drive gear and rotatable about a fixed axis, and operable to transmit torque from said drive gear to the other controller means during a turn in the opposite direction, initiated from 0° of steer.

20. In a wheeled vehicle, a steering system comprising:
 a. a vehicle frame;
 b. two wheels attached to said frame and separately steerable, either of which may be a primary steerable wheel or a secondary steerable wheel;
 c. two wheel steering means, each connected, respectively, with one of said wheels and operable to steer said wheel within a portion of a circle in response to a steer signal;
 d. two position sensing means, each connected, respectively, with one of said wheels for sensing the number of degrees of steer of said wheel and for generating and transmitting a signal that is a function of said degrees of steer;
 e. two comparator means, each connected, respectively, with one of said steering means and connected with the one of said position sensing means associated with one of said steering means, and operable to generate a steer signal in response to a primary control signal or a follower response signal and to terminate said steer signal when said sensing means indicates said wheel has been steered through the number of degrees that is functionally equivalent to, respectively, said primary control signal or said follower response signal;
 f. two controller means, each connected, respectively, with one of said comparator means and operable to generate a primary control signal in response to a turn signal from an actuator or a follower response signal in response to a programmer;
 g. selector means connected with said two controller means and operable to impart a turn signal singly and respectively to said controller means;
 h. actuator means connected with said selector means for generating a turn signal for actuating a turn;
 i. a programmer connected with said two controller means and operable to receive a primary control signal from either of said controller means and in response thereto, to generate and transmit to the other of said controller means a follower response signal, said programmer having signal translating means effecting a ratio of said follower response signal to said primary control signal that is the same as the ratio of the degrees of rotation of a first focal point of a driven ellipse to the number of degrees of rotation of the opposite first focal point of a driving ellipse rotating twice the number of degrees that said primary steerable wheel is steered; said ellipses being identical, being placed tangential such that their focal points on their major axes form the apices of a rectangle at the position equivalent to 0° of steer, having a set of first and opposite focal points disposed a fixed distance apart and located at points fixed in space, and having their other, respective, and opposite focal points on their major axes in fixed spaced relationship but free to move in a plane.

21. The steering system of claim 20 wherein said position sensing means consists essentially of a position sensor sensing the degrees of steer of the respective wheel with which it is associated and generating a unique signal which is a function of said degrees of steer, a selsyn transmitter generating and transmitting a signal unique to the position indicated by said position sensor, a slave selsyn receiver connected with said selsyn transmitter and adapted to assume a slave position for each unique signal therefrom, said slave position being relatable to the degrees of steer of said wheel, and a slave pivotable indicator plate responsively connected with said slave selsyn receiver and adapted to assume said slave position.

22. The steering system of claim 20 wherein said comparator means consists essentially of a holder having at each of its two U-shaped ends a light source and an electronic device rendered conductive by said light source, each electronic device being connected in a circuit with a power source and one of said wheel steering means and operable to send a directional steer signal to said one of said wheel steering means when bombarded by light from said light source.

23. The steering system of claim 20 wherein said controller means is a sector gear rotatable about a fixed axis in response, respectively, to urging from said selector means or said programmer.

24. The steering system of claim 20 wherein said programmer employs as the equivalent of said ellipses a first shaft simulating the focal point of said driving ellipse and having rigid connection means with a first connecting means located at the point in space that is equivalent to the other focal point on the major axis of said driving ellipse, and a second shaft simulating the opposite focal point of said driven ellipse and having second rigid connection means with a second connecting means located at the point in space that is equivalent to the other focal point on the major axis of said driven ellipse; said first connecting means and said second connecting means being maintained in fixed spaced relationship but free to move in a plane, and as opposite focal points by a connecting bar; and meshing means attached to said rigid connection means and located at the points in space equivalent to the maximum dimensions of the major axis of each respective ellipse to move said rigid connection means from dead center position and maintain said shafts as opposite focal points.

25. The steering system of claim 24 wherein the distance between focal points of each respective ellipse and hence the distance between said respective shafts and connecting means is the major axis multiplied by the cosine of an angle $\alpha$ generated by lines extended from a midpoint between outside nonsteering wheels attached to said frame to one of the nonsteering wheels and to the steerable wheel on the same side as said one of said nonsteering wheels, and the minor axis length is the major axis length multiplied by the sine of the angle $\alpha$.

26. The steering system of claim 24 wherein the effective radius of said respective meshing means is equal to the ellipse major axis multiplied by $(\sin \alpha)^2$.

27. The steering system of claim 20 wherein said wheel steering means is an electric motor turning an arrangement of gears connected so as to impart steer to said wheel in response to rotation of said motor.

28. The steering system of claim 20 wherein said actuator consists essentially of a turn switch mounted on an operator's console and adapted for generating a turn left signal when moved in one direction and for generating a turn right signal when moved in another direction; a reversible electric motor electrically connected with said turn switch and operable to rotate in either direction in response to the particular turn signal from said turn switch.

29. The steering system of claim 20 wherein said selector means consists essentially of a drive gear and meshing therewith an idler gear; said drive gear connected with a reversible electric motor of said actuator means and rotatably responsive to torque therefrom and operable to impart torque to one controller means during turn in one direction, initiated from a position of 0° of steer; and said idler gear maintained in engagement with said drive gear and rotatable about a fixed axis, and operable to transmit torque from said drive gear to the other controller means during a turn in the opposite direction, initiated from 0° of steer.

30. Apparatus for steering a vehicle comprising:
a. a vehicle frame;
b. two wheels attached to said frame and separately steerable;
c. two wheel steering means, each connected, respectively, with one of said wheels and operable to steer said wheel in response to a steer signal;
d. means for generating and imparting to a first one of the steering means a first steer signal;
e. means for generating and imparting to a second of the steering means a second steer signal; and
f. programmer means for establishing a relationship between said first and second steer signals such that said second steer signal is related to said first steer signal as the degrees of rotation of a first focal point of a driven ellipse is related to the number of degrees of rotation of the opposite first focal point of a driving ellipse rotating twice the number of degrees that the first wheel is steered in response to the first steering signal; said ellipses being identical, being placed tangential such that their focal points on their major axes form the apices of a rectangle at the position equivalent to 0° of steer, having a set of first and opposite focal points disposed a fixed distance apart and located at points fixed in space, and having their other, respective, and opposite focal points on their major axes in fixed space relationship but free to move in a plane.

31. The steering system of claim 30 wherein said programmer means comprises identical ellipses having the relationships recited in element (f) and mounted on respective shafts located at said first and opposite focal points for rotation about their first focal points and connected together via connecting means located on said ellipses at their respective other and opposite focal points on their major axes; and wherein the distance between focal points on each respective ellipse and hence the distance between respective shafts and connecting means is the major axis multiplied by the cosine of an angle $\alpha$ generated by lines extended from a midpoint between outside nonsteering wheels attached to said frame to one of the nonsteering wheels and to the steerable wheel on the same side as said one of said nonsteering wheels, and the minor axis length of said ellipses is the major axis length multiplied by the sine of the angle $\alpha$.

32. The steering system of claim 30 wherein said programmer means comprises as said ellipses a first shaft located at the first focal point of said driving ellipse and having rigid connection means with a first connecting means located at the other focal point on the major axis of said driving ellipse, and a second shaft located at the opposite first focal point of said driven ellipse and having a second rigid connection means with a second connecting means located at the other focal point on the major axis of said driven ellipse; said first connecting means and said second connecting means being maintained in fixed spaced relationship but free to move in a plane, and as opposite focal points by a connecting bar; and meshing means attached to said rigid connection means and located at the points in space equivalent to the maximum dimensions of the major axis of each respective ellipse to move said rigid connection means from dead center position and maintain said shafts as opposite focal points.

33. The steering system of claim 32 wherein the distance between each respective shaft and connecting means along the respective rigid connection means is the major axis of an equivalent ellipse multiplied by the cosine of an angle $\alpha$ generated by lines extended from a midpoint between outside nonsteering wheels attached to said frame to one of the nonsteering wheels and to the steerable wheel on the same side as said one of said nonsteering wheels, and said shafts and said connecting means are so spaced as to define a minor axis length of an equivalent ellipse that is the major axis length multiplied by the sine of the angle $\alpha$.